United States Patent [19]
Gray et al.

[11] Patent Number: 6,128,727
[45] Date of Patent: Oct. 3, 2000

[54] SELF MODIFYING CODE TO TEST ALL POSSIBLE ADDRESSING MODES

[75] Inventors: Christopher Gray; Michael Wisor, both of Austin, Tex.

[73] Assignee: Advanced Micro Devices, Inc., Sunnyvale, Calif.

[21] Appl. No.: 09/137,610

[22] Filed: Aug. 21, 1998

[51] Int. Cl.[7] .................................................. G06F 11/00
[52] U.S. Cl. ........................... 712/227; 712/226; 714/35; 714/730
[58] Field of Search ............................... 712/23, 226, 227, 712/238, 213, 220; 714/25, 30, 34, 35, 38, 49, 52, 730, 739, 743, 805, 819, 839, 727, 724, 725; 702/119

[56] References Cited

U.S. PATENT DOCUMENTS

| | | | |
|---|---|---|---|
| 5,226,149 | 7/1993 | Yoshida et al. | 714/25 |
| 5,404,466 | 4/1995 | Inoue | 712/227 |
| 5,475,852 | 12/1995 | Yoshida et al. | 714/34 |
| 5,477,548 | 12/1995 | Beenker et al. | 714/727 |
| 5,633,877 | 5/1997 | Shephard, III et al. | 714/725 |
| 5,668,947 | 9/1997 | Batcher | 714/30 |
| 5,692,167 | 11/1997 | Grochowski et al. | 712/226 |
| 5,995,915 | 11/1999 | Reed et al. | 702/119 |
| 5,996,071 | 11/1999 | White et al. | 712/238 |
| 6,023,758 | 2/2000 | Kodama et al. | 712/220 |
| 6,041,405 | 3/2000 | Green | 712/213 |
| 6,049,900 | 4/2000 | Fournel et al. | 714/724 |

*Primary Examiner*—John A. Follansbee
*Assistant Examiner*—Walter Benson
*Attorney, Agent, or Firm*—Conley, Rose & Tayon, PC; B. Noel Kivlin

[57] ABSTRACT

A method and system for testing a plurality of addressing modes in a microprocessor comprising executing a test instruction which is stored in memory, subsequently overwriting the test instruction in memory and then re-executing the test instruction. The test instruction is stored at a memory location which is within a code segment. A data segment is defined to overlap with the code segment and a portion of the test instruction is overwritten by storing data within the overlapping data segment. The overwritten portion of the test instruction identifies the addressing mode of the test instruction and the stored data represents the next addressing mode to be tested. In an x86 architecture, the overwritten portion of the test instruction may comprise a MODR/M byte and an SIB byte, each of which may take on values from 00 to ff (hexadecimal). The addressing modes of the microprocessor may therefore be tested by sequentially incrementing the MODR/M and SIB bytes and executing the test instruction.

10 Claims, 4 Drawing Sheets

| PREFIX: | INSTRUC-TION | ADDRESS SIZE | OPERAND SIZE | SEGMENT OVERRIDE |
|---|---|---|---|---|
| SIZE: | 0 OR 1 | 0 OR 1 | 0 OR 1 | 0 OR 1 |

| TYPE: | OPCODE | MODR/M | SIB | DISPLACE-MENT | IMMEDIATE |
|---|---|---|---|---|---|
| SIZE: | 1 OR 2 | 0 OR 1 | 0 OR 1 | 0,1,2 OR 4 | 0,1,2 OR 4 |

Fig. 5

| MOD | REG/OPCODE | R/M |
|---|---|---|
| 7  6 | 5  4  3 | 2  1  0 |

Fig. 6

| SS | INDEX | BASE |
|---|---|---|
| 7  6 | 5  4  3 | 2  1  0 |

Fig. 7

SELF MODIFYING CODE TO TEST ALL POSSIBLE ADDRESSING MODES

BACKGROUND OF THE INVENTION

1. Field of the Invention

The invention relates generally to the testing of microprocessors and more particularly to the use of self-modifying code for testing the addressing modes which are available in a microprocessor.

2. Description of the Relevant Art

As a result of the increasing speed and complexity of integrated circuits (ICs), these devices can incorporate more and more functions. As a result, it is becoming increasingly difficult and time consuming to test and debug the design and operation of these products. (Debugging is the process of finding and eliminating problems, or bugs, in hardware or software.)

When a new IC design is implemented, it must be debugged and tested to ensure that each feature of the device functions as expected. The complexity of debugging and testing has grown commensurately with the complexity of the devices themselves. The increased costs and time to debug and test can cause delays which disrupt manufacturing flows and hinder manufacturers' efforts to bring the products to market.

A microprocessor is one type of device which presents a complex testing environment. A great deal of the time required to develop and implement a new microprocessor design is spent on debugging the design. Because debugging has an enormous impact on the development cycle of new microprocessors, faster and more powerful debugging tools have had to be developed. These tools include both features internal to the microprocessor which facilitate debugging, and external tools such as logic analyzers and debug/test software.

Microprocessor debug and test systems in the prior art are typically implemented using a computer system such as a personal computer (PC). The PC is coupled to interface hardware, which is in turn coupled to the microprocessor. Software tools are executed on the PC to provide debug/test functionality. Because of the complexity of microprocessors and their functions, software debug/test tools must also be very complex. Individual tests must be conducted on the microprocessor to ensure that each of the functions of the device is properly performed.

The testing of a microprocessor may be made more complicated by the fact that the device may provide more than one way to perform a given function. For example, a microprocessor requires address information in order to perform an operation such as a load, but the address may be specified in a number of different ways. The address may be given in the form of an immediate value, an offset from a base value, a pointer (which points to a value), or in various other forms. The debug/test application must be programmed to test each of the addressing modes to ensure that the design functions properly.

Debug/test software in the prior art uses in-line code to test the addressing modes of a microprocessor. Sections of code are included to test each addressing mode and each section of code is consecutively executed when the microprocessor is tested. Because of the large number of addressing modes which may be provided by the microprocessor, amount of code devoted simply to testing the addressing modes can be very large. The large amount of code which is necessary to test all of the possible addressing modes is time consuming to write, it is tedious and can therefore be prone to errors, it can be difficult to debug and maintain, and it takes up large amounts of storage space.

SUMMARY OF THE INVENTION

One or more of the problems outlined above may be solved by the method of the present invention. The invention uses self-modifying code to testing available addressing modes. The use of self-modifying code may result in executable files which are smaller and may run faster than code written using prior art methods. The inventive method may also reduce the amount of work required to write, maintain and update the test code.

Test code is written to verify the operation of a single addressing mode. The test code is written in a format which employs numeric opcodes rather than instruction mnemonics. Following the test code in program order is code written to increment the addressing mode. After the addressing mode is incremented, the program then loops back to the beginning of the test code and the next addressing mode is tested.

The program includes self-modifying code. That is, a portion of the test code is overwritten by the program on successive iterations of a test loop. The test loop is modified in a controlled manner to cause different addressing modes to be tested. The modification of the code is accomplished by mirroring the code segment of the program with a data segment (i.e., the two segments are mapped to the same location in memory). By mirroring the code and data segments, changes to the data are, in effect, changes to the code. The program increments the addressing mode and then stores addressing mode data in locations occupied by the portions of the test code corresponding to the previous addressing mode. The program thereby updates the test code to allow verification of subsequent addressing modes.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described in below. Self-modifying code is executed on a microprocessor to change the addressing mode of a test instruction which resides in a loop in the code. Upon each iteration of the loop, the code updates the opcode of the test instruction so that it uses the next available addressing mode. The code which embodies the method is placed in random access memory for execution, but may be stored on any suitable persistent storage medium, such as disk drives, magnetic disks or tapes, or other storage means known in the art when it is not being executed.

Figure 1:
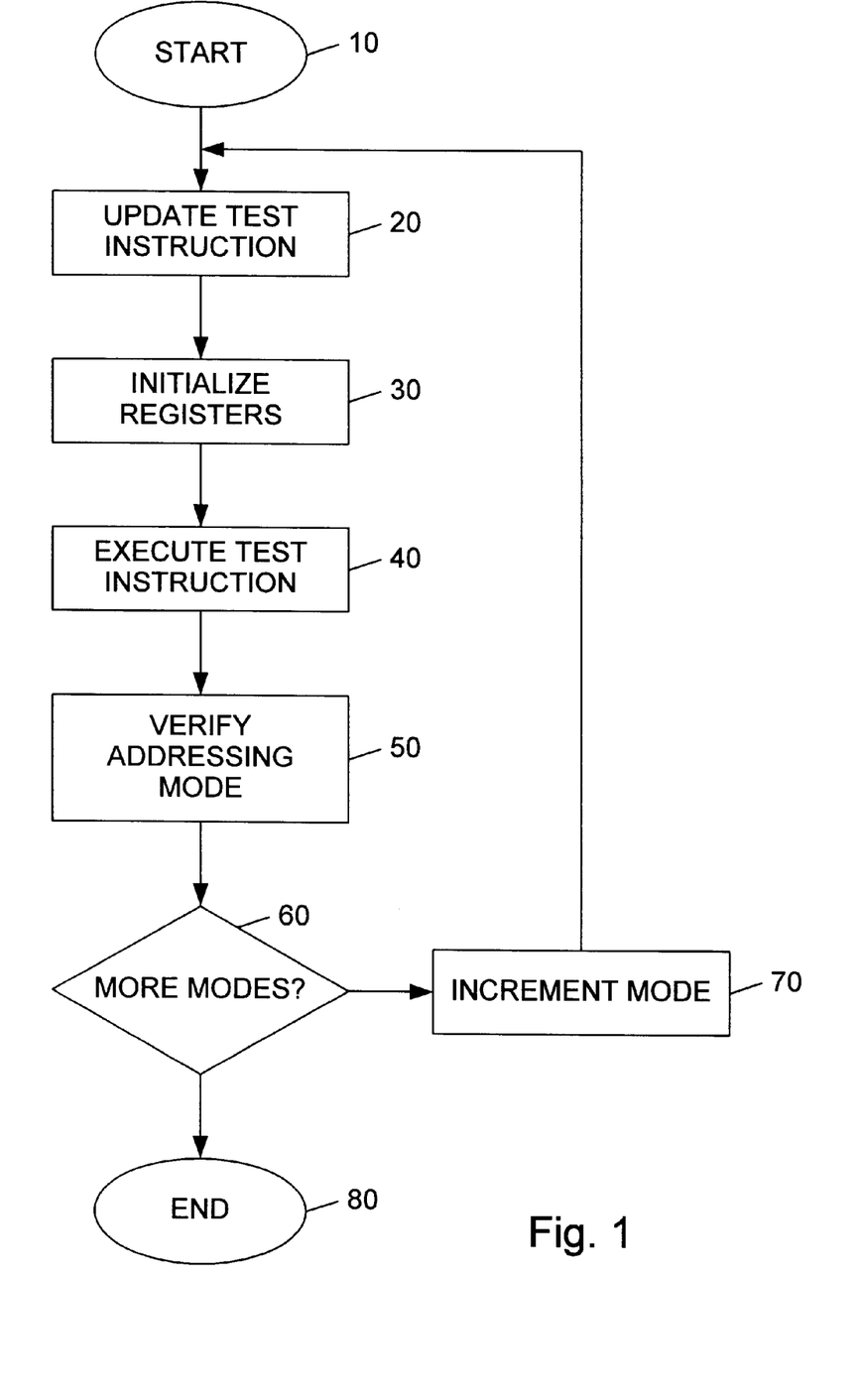
FIG. 1 is a flow diagram illustrating the algorithm of one embodiment of the inventive method.

Referring to FIG. 1, a flow diagram illustrating the algorithm of one embodiment of the inventive method is shown. After the algorithm is started 10, the test instruction is written into the subsequent program code 20. The registers to be used in the testing of the addressing modes are then initialized 30. The initialization of the registers typically consists of loading the registers with known values. When the registers have been initialized, the first addressing mode is tested. The test is performed by executing an instruction (previously written into the program code) which uses a first addressing mode 40 and examining the results of the instruction to determine whether the instruction executed properly 50. Following the test of this addressing mode, it is determined whether there are additional modes to be tested 60. If there are additional addressing modes, the mode is incremented 70. "Incrementing" as used herein means selecting the next addressing mode, although in one embodiment the next addressing mode is selected by adding 1 to the byte(s) which defined the previous addressing mode. The modified test instruction is then executed 40 to test the new addressing mode. After the test instruction has been updated, the registers are again updated 30 and the test instruction is executed 40. This process is repeated until the operation of all of the addressing modes have been verified, at which point the algorithm ends 80.

One embodiment of the invention is implemented in a computer system which is characterized by an x86 architecture. The memory management mechanism in the x86 architecture consists of segmentation and paging mechanisms. The segmentation mechanism can be used to provide a program with several independent, protected address spaces. The paging mechanism is used to provide the program with an address space which is larger than the available random access memory (RAM).

Figure 2:
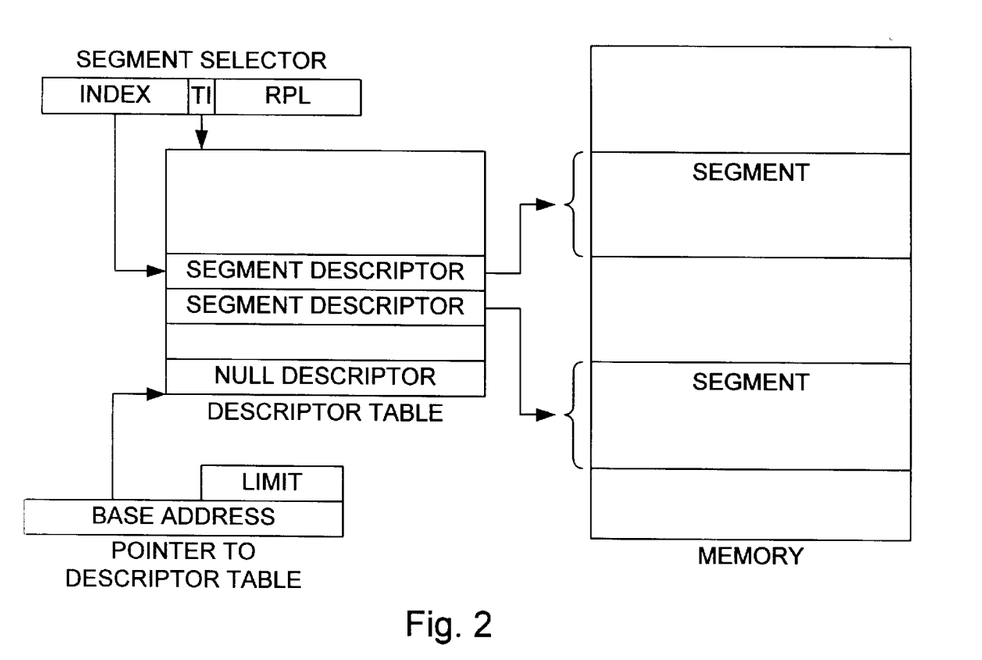
FIG. 2 is a block diagram of a typical memory management model for a system having an x86 architecture.

Referring to FIG. 2, a block diagram of a typical memory management model for a system having an x86 architecture is shown. The fixed, logical address used by an application is translated by the segmentation mechanism into a linear address. If the computer system does not have a paging mechanism, the linear address is also the physical address of the memory location. The paging mechanism swaps "pages" of memory between the memory and the system's hard disk or other persistent storage devices to simulate an address space which is larger than the available memory. If a paging mechanism is implemented, this mechanism translates the linear address into a physical address.

Figure 3:
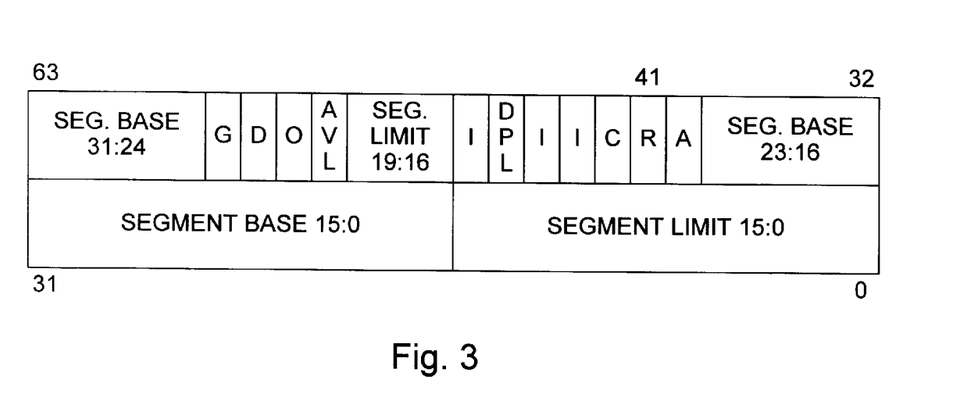
FIG. 3 is a diagram illustrating the structure of a code segment descriptor.

The segmentation mechanism operates on portions of memory called segments. Segments are independent, protected address spaces. Access to memory locations within a segment is controlled by the segmentation mechanism according to a set of predefined data. This set of data is called a segment descriptor. The segment descriptor defines, among other things, the size of the segment, the privilege level required for access to the segment and the types of memory accesses which can be made to locations within the segment. The segment descriptor also includes data indicating whether the segment is present in RAM. A diagram illustrating the structure of a code segment descriptor is shown in FIG. 3. It can be seen from the figure that a code segment includes a readable bit (indicated by the "R" at bit 41). If the readable bit is set, an instruction can read from the segment. Although a code segment may be readable, no instruction is allowed to write into an executable (i.e., code) segment. In fact, an instruction can only write into a data segment if a corresponding writable bit is set.

The operating system's memory management mechanism keeps track of the various segments by using the segment descriptors. The segment descriptors are stored in an array called the segment descriptor table. The first entry in the GDT is a null descriptor which may be used to initialize segment registers. A memory reference to the null descriptor will generate an exception. A particular segment can be accessed by loading the appropriate segment selector into one of the six segment registers available in the x86 architecture. These registers store segment selectors for a code segment (CS), a stack segment (SS) and up to four data segments (DS, ES, FS, GS).

The segmentation mechanism prevents unauthorized access to the data or code in each segment. This prevents programs which are not associated with particular segments from encroaching on those segments and corrupting the stored data or code. This is useful to prevent one program from causing the failure of another. For example, when the stack of a first program approaches the code of a second program, segmentation will prevent the stack from growing into the second program's code and causing it to fail. Likewise, controlled access to the segments is used to prevent code from modifying itself.

Figure 4:
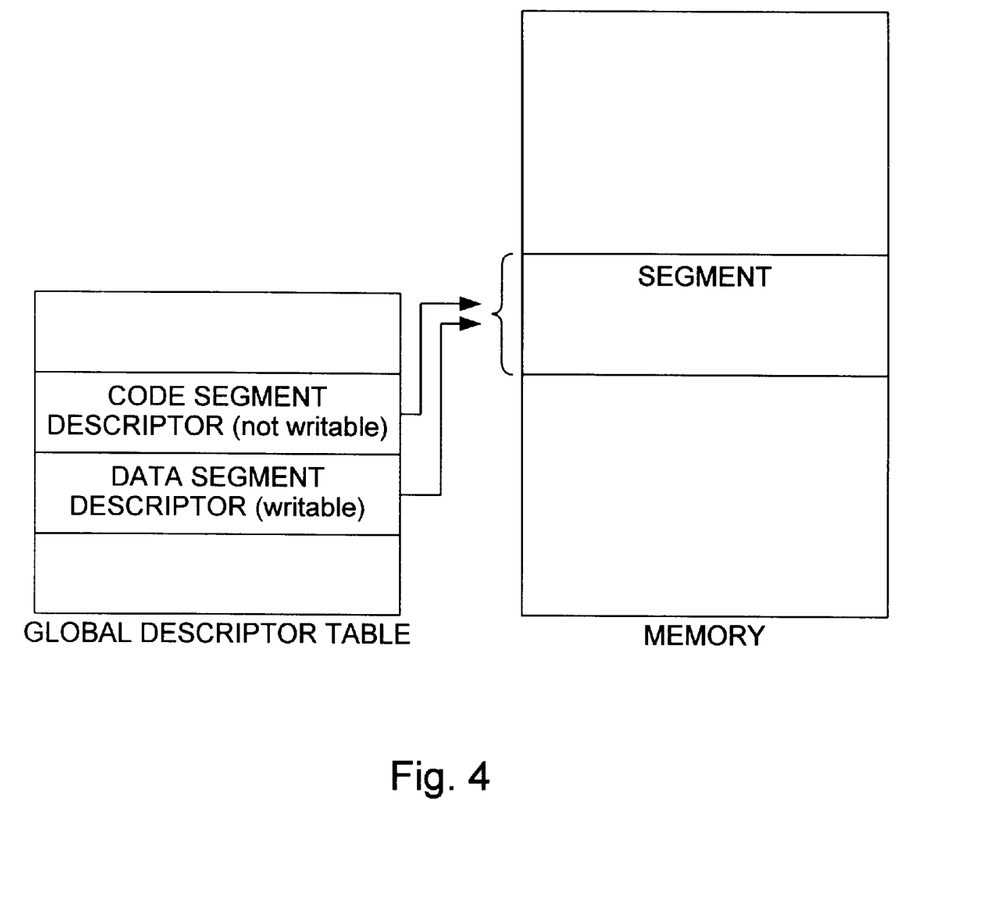
FIG. 4 is a block diagram of a typical memory management model for a system having an x86 architecture wherein two segments are overlapped so that they occupy the same locations in memory.

While the segmentation mechanism can be used to allocate separate portions of the physical memory to the various segments as shown in FIG. 2, the segments may be overlapped so that they occupy the same locations in memory as shown in FIG. 4. When the segments are overlapped, or "mirrored", access which may not be allowed for one segment may be allowed for another segment. Thus, an instruction in a code segment cannot be accessed by reference to the code segment descriptor, but a data location which coincides with the instruction's location can be modified by reference to the data segment descriptor. Memory locations for which access is denied via one segment may thereby be accessed via another, overlapped segment. A program's code segment can therefore be modified by accesses through a mirrored data segment.

Figure 5:
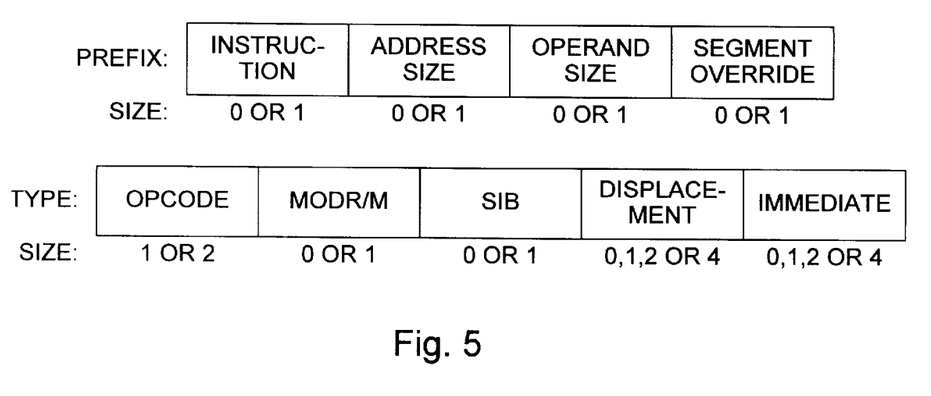
FIG. 5 is an illustration of the general format for instructions in an x86 architecture.

In one implementation of an x86 architecture, all instructions are encoded in the format shown in FIG. 5. The format illustrated in the figure consists of several instruction prefixes, an opcode, a MODR/M byte, an SIB byte, a displacement and an immediate value. Although the figure is illustrated in two parts, the prefixes (shown at the top of the figure) are appended to the instruction before the opcode. As indicated by the number of bytes for each component of the instruction format (e.g., "0 or 1"), not all of the components are included in each instruction. The only component which is included in every instruction is the opcode, which may have either one or two bytes.

Figure 6:
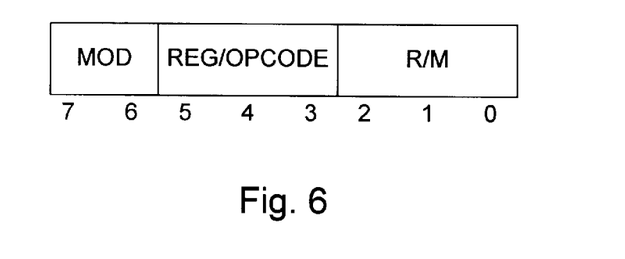
FIG. 6 is an illustration of the structure of the MODR/M byte used in the x86 instruction format.
Figure 7:
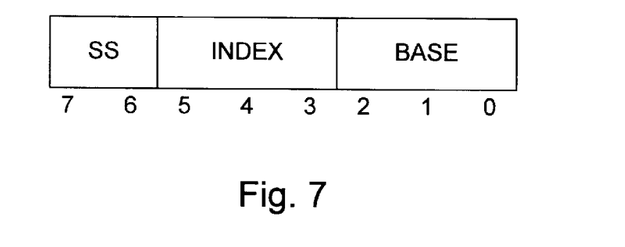
FIG. 7 is an illustration of the structure of the SIB byte used in the x86 instruction format.

The MODR/M and SIB bytes are used to indicate the register, type of indexing, base, index, scale and other information to be used in the instruction. The structure of the MODR/M byte is illustrated in FIG. 6. This figure shows that the MODR/M byte comprises a MOD field of two bits, a register/opcode field of three bits, and an R/M field of three bits. The MOD and R/M fields, taken together, can be used to specify a number of registers and/or addressing modes. The register/opcode field can either specify one of eight registers or provide three additional bits of opcode information. The structure of the SIB byte is illustrated in FIG. 7. This figure shows that the SIB byte also has three fields: a two-bit SS field; a three-bit index field; and a three-bit base field. The SS field specifies a scale factor. The index field specifies which of eight registers is to be used as an index register. The base field specifies which of eight registers is to be used as a base register.

The possible combinations of the bits in the fields of the MODR/M byte and the corresponding addressing modes are shown in Table 1. The addressing modes shown in Table 1 are for 32-bit addressing. It should be noted that three combinations of the MOD and R/M fields indicate that an SIB byte follows the MODR/M byte. The combinations of the bits in the SIB byte are shown in Table 2 with their corresponding 32-bit addressing modes. ("[--][--]" indicates that the MODR/M byte is followed by an SIB byte.

TABLE 1

(MODR/M)

| MODE | MOD | R/M | \multicolumn{8}{c|}{REG/OPCODE} |
| | | | 000 | 001 | 010 | 011 | 100 | 101 | 110 | 111 |
| --- | --- | --- | --- | --- | --- | --- | --- | --- | --- | --- |
| [EAX] | 00 | 000 | 00 | 08 | 10 | 18 | 20 | 28 | 30 | 38 |
| [ECX] | | 001 | 01 | 09 | 11 | 19 | 21 | 29 | 31 | 39 |
| [EDX] | | 010 | 02 | 0A | 12 | 1A | 22 | 2A | 32 | 3A |
| [EBX] | | 011 | 03 | 0B | 13 | 1B | 23 | 2B | 33 | 3B |
| [--][--] | | 100 | 04 | 0C | 14 | 1C | 24 | 2C | 34 | 3C |
| disp32 | | 101 | 05 | 0D | 15 | 1D | 25 | 2D | 35 | 3D |
| [ESI] | | 110 | 06 | 0E | 16 | 1E | 26 | 2E | 36 | 3E |
| [EDI] | | 111 | 07 | 0F | 17 | 1F | 27 | 2F | 37 | 3F |
| disp8[EAX] | 01 | 000 | 40 | 48 | 50 | 58 | 60 | 68 | 70 | 78 |
| disp8[ECX] | | 001 | 41 | 49 | 51 | 59 | 61 | 69 | 71 | 79 |
| disp8[EDX] | | 010 | 42 | 4A | 52 | 5A | 62 | 6A | 72 | 7A |
| disp8[EBX] | | 011 | 43 | 4B | 53 | 5B | 63 | 6B | 73 | 7B |
| disp8[--][--] | | 100 | 44 | 4C | 54 | 5C | 64 | 6C | 74 | 7C |
| disp8[EBP] | | 101 | 45 | 4D | 55 | 5D | 65 | 6D | 75 | 7D |
| disp8[ESI] | | 110 | 46 | 4E | 56 | 5E | 66 | 6E | 76 | 7E |
| disp8[EDI] | | 111 | 47 | 4F | 57 | 5F | 67 | 6F | 77 | 7F |
| disp32[EAX] | 10 | 000 | 80 | 88 | 90 | 98 | A0 | A8 | B0 | B8 |
| disp32[ECX] | | 001 | 81 | 89 | 91 | 99 | A1 | A9 | B1 | B9 |
| disp32[EDX] | | 010 | 82 | 8A | 92 | 9A | A2 | AA | B2 | BA |
| disp32[EBX] | | 011 | 83 | 8B | 93 | 9B | A3 | AB | B3 | BB |
| disp32[--][--] | | 100 | 84 | 8C | 94 | 9C | A4 | AC | B4 | BC |
| disp32[EBP] | | 101 | 85 | 8D | 95 | 9D | A5 | AD | B5 | BD |
| disp32[ESI] | | 110 | 86 | 8E | 96 | 9E | A6 | AE | B6 | BE |
| disp32[EDI] | | 111 | 87 | 8F | 97 | 9F | A7 | AF | B7 | BF |
| EAX/AX/AL | 11 | 000 | C0 | C8 | D0 | D8 | E0 | E8 | F0 | F8 |
| ECX/CX/CL | | 001 | C1 | C9 | D1 | D9 | E1 | E9 | F1 | F9 |
| EDX/DX/DL | | 010 | C2 | CA | D2 | DA | E2 | EA | F2 | FA |
| EBX/BX/BL | | 011 | C3 | CB | D3 | DB | E3 | EB | F3 | FB |
| ESP/SP/AH | | 100 | C4 | CC | D4 | DC | E4 | EC | F4 | FC |
| EBP/BP/CH | | 101 | C5 | CD | D5 | DD | E5 | ED | F5 | FD |
| ESI/SI/DH | | 110 | C6 | CE | D6 | DE | E6 | EE | F6 | FE |
| EDI/DI/BH | | 111 | C7 | CF | D7 | DF | E7 | EF | F7 | FF |

TABLE 2

(SIB)

| Scaled Index | SS | Index | Base 000 | 001 | 010 | 011 | 100 | 101 | 110 | 111 |
|---|---|---|---|---|---|---|---|---|---|---|
| [EAX] | 00 | 000 | 00 | 08 | 10 | 18 | 20 | 28 | 30 | 38 |
| [ECX] |  | 001 | 01 | 09 | 11 | 19 | 21 | 29 | 31 | 39 |
| [EDX] |  | 010 | 02 | 0A | 12 | 1A | 22 | 2A | 32 | 3A |
| [EBX] |  | 011 | 03 | 0B | 13 | 1B | 23 | 2B | 33 | 3B |
| none |  | 100 | 04 | 0C | 14 | 1C | 24 | 2C | 34 | 3C |
| [EBP] |  | 101 | 05 | 0D | 15 | 1D | 25 | 2D | 35 | 3D |
| [ESI] |  | 110 | 06 | 0E | 16 | 1E | 26 | 2E | 36 | 3E |
| [EDI] |  | 111 | 07 | 0F | 17 | 1F | 27 | 2F | 37 | 3F |
| [EAX*2] | 01 | 000 | 40 | 48 | 50 | 58 | 60 | 68 | 70 | 78 |
| [ECX*2] |  | 001 | 41 | 49 | 51 | 59 | 61 | 69 | 71 | 79 |
| [EDX*2] |  | 010 | 42 | 4A | 52 | 5A | 62 | 6A | 72 | 7A |
| [EBX*2] |  | 011 | 43 | 4B | 53 | 5B | 63 | 6B | 73 | 7B |
| none |  | 100 | 44 | 4C | 54 | 5C | 64 | 6C | 74 | 7C |
| [EBP*2] |  | 101 | 45 | 4D | 55 | 5D | 65 | 6D | 75 | 7D |
| [ESI*2] |  | 110 | 46 | 4E | 56 | 5E | 66 | 6E | 76 | 7E |
| [EDI] |  | 111 | 47 | 4F | 57 | 5F | 67 | 6F | 77 | 7F |
| [EAX*4] | 10 | 000 | 80 | 88 | 90 | 98 | A0 | A8 | B0 | B8 |
| [ECX*4] |  | 001 | 81 | 89 | 91 | 99 | A1 | A9 | B1 | B9 |
| [EDX*4] |  | 010 | 82 | 8A | 92 | 9A | A2 | AA | B2 | BA |
| [EBX*4] |  | 011 | 83 | 8B | 93 | 9B | A3 | AB | B3 | BB |
| none |  | 100 | 84 | 8C | 94 | 9C | A4 | AC | B4 | BC |
| [EBP*4] |  | 101 | 85 | 8D | 95 | 9D | A5 | AD | B5 | BD |
| [ESI*4] |  | 110 | 86 | 8E | 96 | 9E | A6 | AE | B6 | BE |
| [EDI*4] |  | 111 | 87 | 8F | 97 | 9F | A7 | AF | B7 | BF |
| [EAX*8] | 11 | 000 | C0 | C8 | D0 | D8 | E0 | E8 | F0 | F8 |
| [ECX*8] |  | 001 | C1 | C9 | D1 | D9 | E1 | E9 | F1 | F9 |
| [EDX*8] |  | 010 | C2 | CA | D2 | DA | E2 | EA | F2 | FA |
| [EBX*8] |  | 011 | C3 | CB | D3 | DB | E3 | EB | F3 | FB |
| none |  | 100 | C4 | CC | D4 | DC | E4 | EC | F4 | FC |
| [EBP*8] |  | 101 | C5 | CD | D5 | DD | E5 | ED | F5 | FD |
| [ESI*8] |  | 110 | C6 | CE | D6 | DE | E6 | EE | F6 | FE |
| [EDI*8] |  | 111 | C7 | CF | D7 | DF | E7 | EF | F7 | FF |

It can be seen from Tables 1 and 2 that there are 256 possible MODR/M byte values and 256 possible SIB byte values. The tables also show that the SIB byte is used with 24 of the MODR/M values (where "[--][--]" is found in the table, the MODR/M byte is followed by an SIB byte). It is therefore apparent that the testing of the addressing modes can be a costly and time-consuming task.

Although there are a large number of addressing modes to be tested, it can be seen from the tables that the structure of the x86 instruction format allows all the possible addressing modes to be tested by modifying only the MODR/M and/or SIB bytes. The addressing modes can be successively selected by incrementing the MODR/M and/or SIB bytes from 00 (hexadecimal) through FF (hexadecimal). The test code can therefore be designed to step through all of the bit combinations corresponding to the addressing modes with a minimal amount of code modification. In one embodiment, the method takes advantage of this pattern to reduce the amount of code and the associated cost of incrementing the addressing mode.

The following pseudo-code illustrates an implementation of one embodiment of the inventive method.

LOOP:
    poke in MODR/M, SIB bytes;
    set up registers;
INST:
    db 0xxh;
    db 0xxh;
    db 0xxh;
    db 0xxh;
    db 0xxh;
    verify operation of instruction;
    increment addressing mode;
    jump to LOOP;

When the debug/test application enters this portion of the code, it first pokes the appropriate MODR/M and SIB bytes into memory at the location of the test instruction. The test instruction immediately follows the label INST. Because the test instruction is located at the INST label, the application can modify the test instruction by storing data at particular offsets from the memory location defined by the label. For example, if the test instruction uses a one-byte opcode followed by a MODR/M byte, the addressing mode indicated by the MODR/M byte can be modified by storing a replacement byte at the location [INST]+1 (i.e., at the address of label INST, plus one byte).

In the pseudo-code above, "db 0xxh" represents one of the data bytes of the test instruction. If the test instruction comprises two bytes, the first two of these lines will be used to specify the instruction. If the instruction has three bytes, three of the lines will be used, and so on. The remainder of the lines of the test instruction are specified as "db 090h". "90" is the opcode for a no-op, so the presence of the additional lines (no-ops) will not affect the operation of the microprocessor. After the test instruction has been executed, the addressing mode is incremented and the program re-executes the instructions beginning at the label LOOP.

If, for example, the test instruction is a move of a doubleword (32 bits) to a register, the opcode for the instruction is 8B. If the doubleword is located at a memory location given by the address [EAX], and the register to receive the doubleword is ECX, the MODR/M byte would be 00001000 (binary) or 08 (hexadecimal). The lines following the INST label would therefore be

| | |
|---|---|
| db 08Bh | (opcode byte) |
| db 008h | (MODR/M byte) |
| db 090h | (no-op) |
| db 090h | (no-op) |
| db 090h | (no-op) |

Before the test instruction is executed, however, the corresponding registers must be set up. EAX and the memory location which it addresses are initialized to known values.

After execution of the move instruction, the contents of ECX can be examined to determine whether it contains the correct result, from which it can be determined whether the instruction properly addressed its operands.

After the test instruction is executed and verified, the addressing mode is incremented. In the example, the addressing mode is identified by MODR/M byte 08. The MODR/M byte would be incremented to 09, which addresses [ECX]. Accordingly, the move instruction should place the data at that memory location into ECX. When the addressing mode has been incremented, the code jumps back to the beginning of the loop (marked by label LOOP.)

At the beginning of the loop, the new value of the MODR/M byte is stored at the location of the appropriate test instruction byte. This effectively changes the addressing mode of the test instruction. The registers are then re-initialized. It is contemplated that the registers may be selectively re-initialized using the same techniques by which the test instruction is updated. That is, the instructions which initialize the registers may be modified to initialize only the registers used in the test instruction. After the registers are re-initialized, the test instruction using the incremented addressing mode is executed. This loop is repeated until all of the addressing modes have been tested.

In this example, only an opcode and a MODR/M byte were needed to specify the instruction and the addressing mode. Other addressing modes require that SIB bytes, displacements, and immediate values be specified. The example is easily extended to these instructions and will enable one of ordinary skill in the art to practice the invention. Likewise, while the present invention has been described with reference to particular embodiments, it will be understood that the embodiments described above are illustrative and that the scope of the invention is not limited to these embodiments. Many variations, modifications, additions and improvements to the described embodiments are possible. These variations, modifications, additions and improvements are intended to be within the scope of the invention as detailed within the following claims.

What is claimed is:

1. A method for using self-modifying code to test a plurality of addressing modes of a microprocessor comprising:

executing a test instruction which implements a first addressing mode;

modifying said test instruction to implement a second addressing mode, wherein
said modifying is accomplished by executing one or more instructions which overwrite at least a portion of said test instruction;

re-executing modified said test instruction.

2. The method of claim 1 further comprising verifying proper execution of said test instruction and said first and second addressing modes.

3. The method of claim 2 wherein said overwriting of said at least a portion of said test instruction is accomplished by mirroring a code segment containing said test instruction and a data segment, said one or more instructions which overwrite said portion of said test instruction being configured to cause data to be stored in said data segment at a location corresponding to said portion of said test instruction.

4. The method of claim 3 further comprising initializing data used by said test instruction prior to executing said test instruction.

5. The method of claim 3 wherein said test instruction comprises an opcode and one or more addressing mode bytes.

6. The method of claim 5 wherein said microprocessor has an x86 architecture and wherein said one or more addressing mode bytes include a MODR/M byte and wherein said portion of said test instruction which is overwritten comprises said MODR/M byte.

7. The method of claim 6 wherein said MODR/M byte is incremented.

8. The method of claim 5 wherein said microprocessor has an x86 architecture and wherein said one or more addressing mode bytes include an SIB byte and wherein said portion of said test instruction which is overwritten comprises said SIB byte.

9. The method of claim 8 wherein said MODR/M byte is incremented.

10. The method of claim 1 wherein said modifying said test instruction and said re-executing modified said test instruction are repeated.

* * * * *

UNITED STATES PATENT AND TRADEMARK OFFICE

CERTIFICATE OF CORRECTION

PATENT NO. : 6,128,727

DATED : Oct. 3, 2000

INVENTOR(S) : Christopher Gray; Michael Wisor

It is certified that error appears in the above-identified patent and that said Letters Patent is hereby corrected as shown below:

Claim 10, col. 10, line 52, please change "modified said" to "said modified".

Signed and Sealed this

Twenty-fourth Day of April, 2001

Attest:

NICHOLAS P. GODICI

Attesting Officer

Acting Director of the United States Patent and Trademark Office